United States Patent [19]

Pinkney, Jr.

[11] 4,215,241

[45] Jul. 29, 1980

[54] SOUND OPERATED CONTROL DEVICE

[75] Inventor: Harry D. Pinkney, Jr., Gardena, Calif.

[73] Assignee: Frank L. Eppenger, Ojai, Calif.

[21] Appl. No.: 951,341

[22] Filed: Oct. 16, 1978

[51] Int. Cl.[2] .............................................. H04M 9/00

[52] U.S. Cl. ............................... 179/1 VC; 179/1 VL

[58] Field of Search ............. 179/1 VC, 1 VL, 1 SW, 179/1 P, 1 HF, 81 B, 100.1 VC; 325/473, 475, 474, 476

[56] References Cited

U.S. PATENT DOCUMENTS

| | | | |
|---|---|---|---|
| 3,497,622 | 2/1970 | Markin et al. .................... | 179/1 VC |
| 4,006,310 | 2/1977 | Bayer ............................... | 179/1 VC |

*Primary Examiner*—Stuart N. Hecker
*Assistant Examiner*—Joseph A. Popek
*Attorney, Agent, or Firm*—Kenneth J. Hovet

[57] ABSTRACT

Two microphones, with at least one being directional and sensitive to different sound, are utilized in conjuction with a comparator circuit and a switching circuit to control electrically energized equipment such as alarm systems, machinery, safety devices and the like. The comparator circuit rectifies the output from each of the microphone amplifiers into either a positive or negative voltage, respectively. The switching circuit is set to pass current only when the voltage from the selected directional microphone exceeds the other microphone voltage by a predetermined value.

10 Claims, 3 Drawing Figures

SOUND OPERATED CONTROL DEVICE

BACKGROUND OF THE INVENTION

1. Field of the Invention

This invention relates to sound operated electrical control devices and, more particularly, to a device for converting selected acoustical sounds into predetermined electrical outputs to actuate means for energizing or de-energizing remote electrical systems.

2. Description of the Prior Art

Sophisticated sound activated electrical control systems are generally based on discriminating between "voiced" sounds and "frictional" sounds or differentiating the frequency distribution between relatively distinctive voiced sounds.

Representative of the former system is U.S. Pat. No. 3,286,031 which utilizes the asymmetric amplitude character of the electrical voice signal envelope not found in frictional sounds. Low-pass and high-pass filters are used in conjunction with an amplitude peak detector to differentiate between the voiced and frictional sounds.

U.S. Pat. No. 3,688,126 is illustrative of the latter system wherein the frequency distribution between the voiced word "yes" and "no" are differentiated. A frequency analyzer and integration circuitry are utilized with flip-flops to form the voice-operated switch.

The above systems are purportedly more reliable than systems based on differences in acoustical input power because of the possibility of occasional loud ambient noise causing unintentional actuation. However, the extensive circuitry and numerous components required in the above systems inherently render them expensive to construct and maintain as a reliable unit. It will also be appreciated that there is a long felt need for sound actuated devices in hospitals, convalescent homes, factories and laboratories which can be produced on an economical large volume basis. Due to the complicated nature of prior art devices, the high cost of manufacture has obviated fulfilling such needs.

SUMMARY OF THE INVENTION

In accordance with the present invention there is provided a novel electrical control device actuated by sound. The device uses a directional microphone located in close proximity to a user's voice and either another directional or an omnidirectional microphone positioned to detect ambient sounds. If the second microphone is a directional microphone it is important to position it to detect sounds away from a user's voice.

Each microphone is provided with an audio amplifier and a rectifying means to form either a positive or negative D.C. voltage. A switching means energized by a predetermined voltage is connected in series to each of the rectifying means. When the requisite voltage appears at the switching means as a result of sound at the directional microphone, it will be energized to activate an ancillary control unit such as an alarm system or equipment power supply unit. Since the invention does not require the use of filters, phase shifters, frequency analyzers or the like, as is typical of the prior art, it will be seen that it is readily adaptable to inexpensive construction on a mass production basis. The use of shield means on the directional microphone and appropriate use of audio amplifiers function to make the invention more sensitive and reliable for particular end uses.

DESCRIPTION OF PREFERRED EMBODIMENTS

Figure 1:
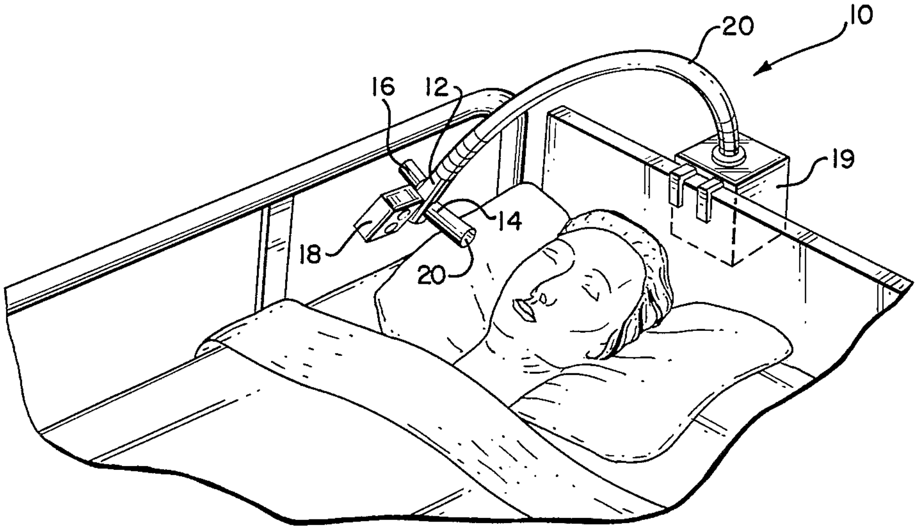
FIG. 1 is a schematic drawing of an exemplary end use of the sound-operated control device of the present invention shown integrated with a hospital call system.

With reference to the drawings and, more particularly to FIG. 1 thereof, a sound-operated electrical control unit 10 is shown for activating a hospital call system. The unit includes a frame 12 from which extends a first directional microphone 14 and a second omnidirectional microphone 16. It will be understood that the second microphone may be directional as long as it is positioned to receive ambient sounds away from the area of reception of the first microphone. As used herein, the term "directional" refers to a microphone which is adapted to receive sound primarily from a particular direction. Various types of microphone and accessory equipment known in the art can accomplish this purpose.

The electrical components and circuitry of the device are contained within housing 18 which is mounted upon frame 12. The frame is conveniently attached to a connecting member 20, which, as shown in the embodiment in FIG. 1, is a flexible tube which is secured to a bed frame. Electrical wires for transmitting signals from the control device extend through the flexible tube. Alternately, the electrical components and circuitry, or portions thereof, may be contained within the tube support housing 19.

As shown, the first directional microphone 14 is located in close proximity to the voice source of a user patient. The second omni directional microphone 16 is directioned away from the sound source and is generally positioned to detect ambient sounds. In this manner, ambient noise will be sensed with microphone 16 while only sound emanating from the user's mouth will be detected with microphone 14.

Depending on the type of directional microphone being utilized, it may be desirable to provide an optional shield means 15 about microphone 14 to minimize the reception of unwanted ambient noise and to facilitate the funneling of sound waves only from the desired source, namely the patient, machine operator, or other user of the device.

Figure 2:
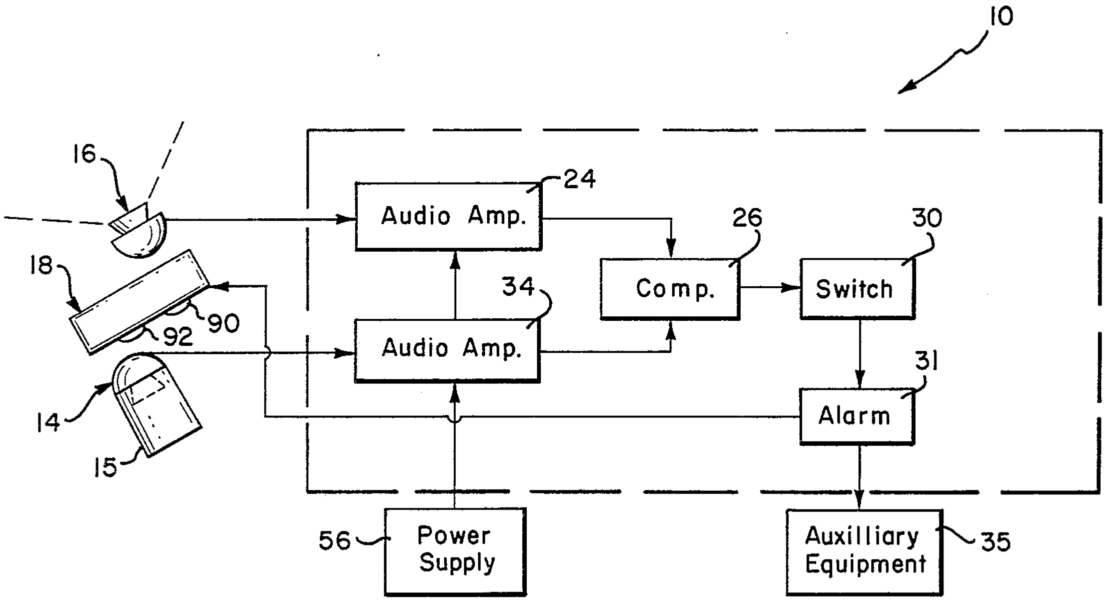
FIG. 2 is a schematic block diagram of the invention shown in FIG. 1.

Referring now to the schematic block diagram of FIG. 2, the electrical signal developed by second microphone means 16 is transmitted to second audio amplifier circuit or channel 24 which provides a suitable amplified output. This output is applied to a comparator network 26 which transforms the signal to a negative voltage. The negative voltage is subsequently transmitted from the comparator network to the switching circuitry 30 which will remain open and deactivated as long as the voltage is negative and/or does not exceed a predetermined triggering or threshold value.

It will be understood that since the signal transmitted to the switching circuit originates from the second omnidirectional microphone 16, a negative voltage will normally be present at the switch continuously. This negative signal is altered by the presence or occurrence of a competing positive voltage which originates with sound detected by the first directional microphone 14.

As with the omnidirectional microphone, sound sensed by the directional microphone is transmitted to a first audio amplifier channel or circuit 34 where it is suitably amplified for transmission to the comparator network 26. The comparator network rectifies the amplified signal to a positive D.C. voltage which is then transmitted to the switching circuit 30. If the sound source provides enough input, the positive voltage will unbalance the current at the switching circuit 30 whereby a switching component will close and energize an alarm system 31 such as the aforementioned hospital call system. The alarm system may further activate auxiliary equipment 35 such bells, lights, press stops, pumps, motors or various types of emergency equipment.

In the preferred embodiment shown, the alarm circuit 34 operates a lamp 90 to indicate to the user that the system has been activated. A second lamp 92 is optionally used to indicate that the unit 10 has power from the primary power source 56.

Figure 3:
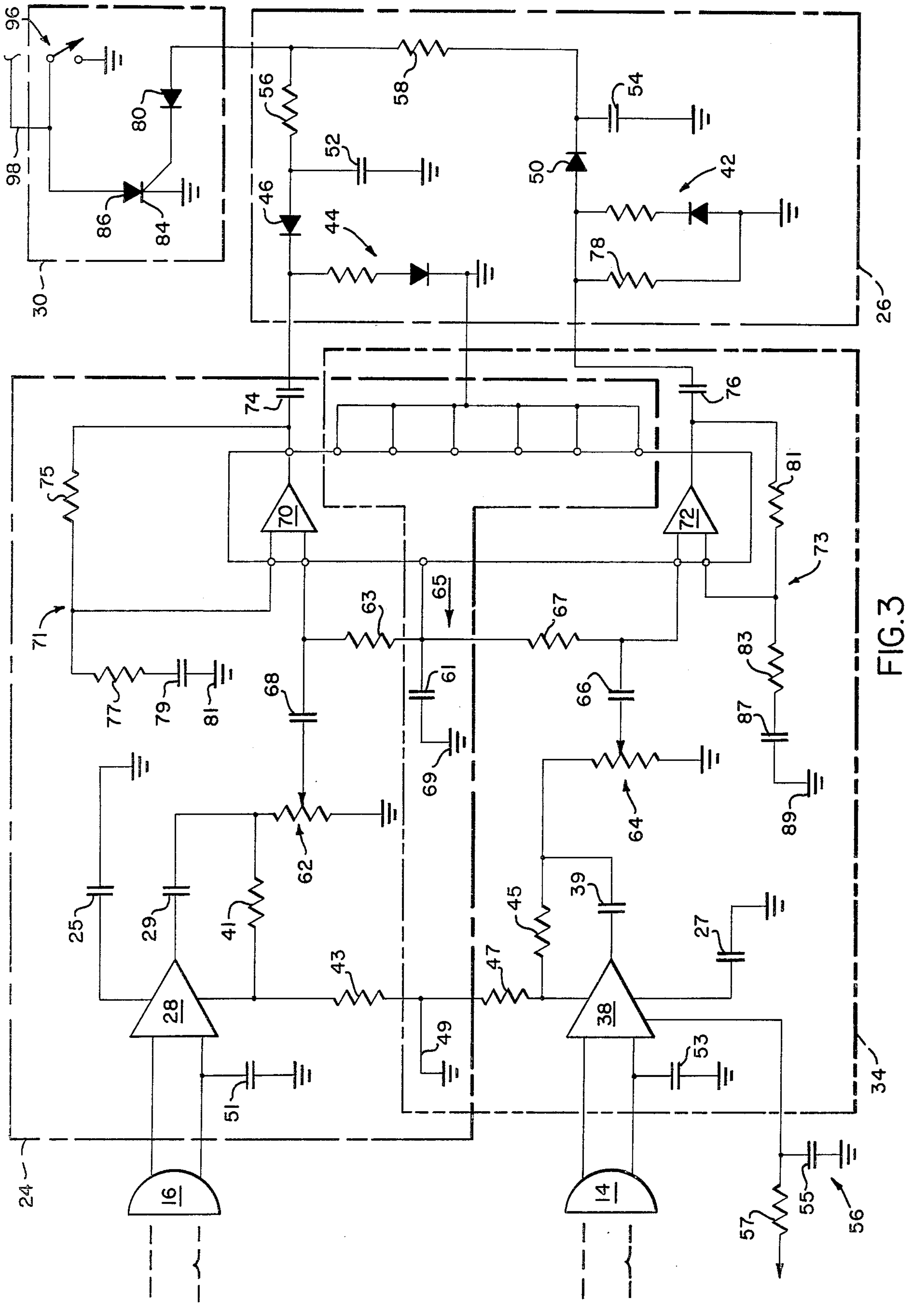
FIG. 3 is a schematic circuit diagram of the invention shown in FIG. 1.

Referring now to FIG. 3, there is shown a detailed schematic circuit diagram of the novel sound-actuated control unit of the present invention which may be integrated with an alarm circuit such as a hospital call system. Each of the audio amplifier circuits 24, 34 preferably comprise corresponding preamplifiers 28, 38, in combination with volume control circuits 62, 64 respectively. Each of the volume controllers are connected to corresponding audio amplifiers 70 and 72.

Current from each of the amplifiers flows into the comparator circuit 26 comprising first and second polarizing means. Such means include essentially oppositely-poled diodes 46 and 50. Second diode 46 rectifies the flow from amplifier circuit 24 to a negative signal while first diode 50 rectifies current from first amplifier circuit 34 to a positive signal. The signals compete with each other at their junction (entrance diode 80) in the switching circuit 30. The switching circuit includes a switching component such as an SCR or transistor having a gate which will be triggered when the positive signal from first diode 50 overcomes the signal from second diode 46 and exceeds a preselected threshold voltage. Upon triggering of the switch component, shown as SCR 84, the alarm circuitry 31 (not shown) and optional auxiliary equipment 35 will be activated.

Describing the circuitry and operation of the control unit 10 in more detail, reference again should be made to FIG. 3. Ambient sound detected by dynamic microphone 16 develops an electrical signal and transmits it to preamplifier 28. Similarly, whenever a person makes an audible sound into dynamic microphone 14, a small current is created which flows through suitable conductors to preamplifier 38. Capacitors 51 and 53 reference one side of microphones 16, 14 to ground respectively. It will be appreciated that other microphones known in the art can be used such as the crystal, carbon, velocity or condensor microphones.

Each of the preamplifiers 28, 38 are internally bypassed to ground through capacitors 25, 27 respectively, and are provided with a filtered 18 volt D.C. power source 56. The power source includes surge capacitor 55 to ground and resistor 57.

Current leaves each of the preamplifiers 28, 38 at about one volt and flows through capacitors 29, 39 respectively, to volume control circuits 62 and 64 which are known in the art. The output from each preamp is stabilized by tying back at the top of each respective volume control circuit into negative feedback circuitry which includes a tie-line directly between each preamp. Such circuitry includes resistors 41, 43 from volume control 62 and preamp 28 and resistors 48, 47 from volume control 64 and preamp 38. The tie-in-lines all lead to common ground 49.

Each volume control circuit 62, 64 is used to adjust the individual gain of each channel, i.e., the "Off" second channel from microphone 16 and the "On" first channel from microphone 14. This allows one to custom tune the device for more effective operation relative to individual needs. It will be appreciated that generally the "On" channel can be desensitized to a greater extent than the "Off" channel since it normally receives a stronger more direct signal from the user. This also assists in avoiding relatively loud unwanted ambient sounds from triggering the device.

From each of the volume control output circuits, A.C. voltage passes through isolating capacitors 66 and 68 and then to a biasing circuit 65. Each of the capacitors are used to maintain the desired amplifier D.C. bias voltage levels leading to audio amplifiers 70 and 72. The biasing circuit includes tie-in lines with corresponding resistors 63, 67 leading to a common capacitor 61 and ground 69. It will be appreciated that the bias voltage can be provided by an internal connection on an integrated circuit chip which contains amplifiers 70 and 72. It will also be noted that the biasing circuit sets the operating point of the audio amplifiers for linear amplification.

Each of the audio amplifiers 70, 72 is conveniently part of a dual power amplifier micro-circuit chip commercially available having an 18 volt power source (not shown) and respective negative feedback loops 71 and 73. Loop 71 includes resistors 75, 77 leading to capacitor 79 and ground 81. Similarly, loop 73 includes resistors 81, 83 leading to capacitor 84 and ground 89. The negative feedback loops operate to stabilize each respective amplifier output. It will be understood that amplifiers are designed to amplify each of the outputs to a level sufficient to operate the downstream switching circuitry 30. A dual two-watt audio amplifier has been found to be suitable for the present invention but other amplifiers can be used depending on the impedance load presented by the downstream circuits.

Output from each amplifier 70, 72 flows through isolating capacitors 74, 76 respectively. The isolating capacitors function to maintain the appropriate D.C. voltage output level while conducting the alternating current component to the comparator network 26. Current from capacitor 74 is rectified into a negative signal by diode 46. The diode is part of a voltage doubling circuit known in the art and shown generally by reference numeral 44. Thereafter current flows through capacitor 52 which operates to average and maintain a high negative voltage level which is necessary to prevent echos of the ambient sounds from operating the device for a time period determined by in-line resistors 56 and 58.

Current from amplifier 72 and isolating capacitor 76 likewise flows through voltage doubling circuit 42 and diode 50 where it is rectified into a positive signal. This current is averaged and maintained by capacitor 54 for a time period also determined by resistors 56 and 58 to prevent very high-amplitude, high-frequency signals from actuating the switching circuit 30. Resistors 56 and 58 can be made variable to afford a further means of adjusting the device.

It will be noted that a resistor 78 is included in the circuit downstream from capacitor 76. The purpose of this resistor is to absorb any positive voltage surge when the overall device is energized.

It can be assumed that the "On" channel from microphone 16 has a continuously existing signal due to ambient sound. As such, a negative current will exist at entrance diode 80 most of the time. When the "Off" channel is activated from sound received in microphone 14, the positive signal created thereby at the entrance diode will cancel the negative potential and pass through said diode to the gate 84 of SCR 86.

When the positive charge exceeds a predetermined voltage at gate 84, it will flow into the SCR which will be triggered into conduction. This, in turn, acts as a switch across conductor 98 leading to alarm system 31 which also activates various ancillary switching circuits shown in general by reference numeral 35. Specific alarm circuitry is not shown since such is dependent on specific end uses of the present invention.

Such circuitry should preferably include, however, a LED indicator lamp 92 to show when the device is energized with a power source and lamp 90 to show when it has been activated or deactivated as a result of the user's audible signals. Also, the device should preferably include a manual override switch shown by reference numeral 96 to reset the circuitry and/or operate other devices through output conductor 98. Switch 96, by shorting the SCR's anode to ground, will remove all voltage from the device allowing it to reset itself to its normal "off" condition. However, by so shorting the anode to ground, the switch (until released or reset) takes over the function of the SCR operating the alarm and/or various ancillary switching circuits manually.

It is to be noted that exact component valves and terminal identifications have not been given for the amplifiers since many "op. amps" can be used. Anyone skilled in the art can supply these from reference works on specification sheets provided by the manufacturer. Likewise, the individual components of the comparator and switching circuits are known whereby their values are a matter of choice as set forth by manufacturer specifications. Therefore, while the invention has been described with respect to a preferred embodiment, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

What is claimed is:

1. A sound-operated electrical control device adapted to receive predetermined sounds to activate switching means connected to electrical auxillary equipment upon receipt of predetermined sounds comprising:

a first circuit having first receptor means to receive a predetermined sound and generate a corresponding first electrical signal which is classified to a first polarity with first polarizing means; and, a second circuit in parallel with said first circuit having second receptor means to receive ambient sound and generate a corresponding second electrical signal which is classified to a second polarity with second polarizing means; and, switching means interconnecting said first and second circuits allowing either one or the other of said first and second signals to pass and activate the auxillary equipment, said first and second polarizing means comprising oppositely-poled diodes.

2. The device of claim 1 wherein said first receptor means comprises a microphone directed toward the predetermined sounds, and said second receptor means comprises a microphone directed directed away from the predetermined sounds.

3. The device of claim 1 wherein said first and second circuits each include audio amplifier means to amplify each of said corresponding electrical signals prior to being classified with said first and second polarizing means.

4. The device of claim 3 wherein said first and second circuits each include a preamplifier means located in each of said circuits after said receptor means, and further including volume control components located in each of said circuits after the preamplifier means.

5. The device of claim 1 wherein said switching means includes an electrical switching component having an entrance means with a threshold voltage which must be exceeded before a selected signal will be transmitted.

6. The device of claim 5 wherein the switching component comprises a silicon controlled rectifier.

7. A sound-operated electrical control system comprising:

first and second microphone means connected to corresponding parallel first and second audio channels, each of said channels having a means to rectify signals from said microphone means into respective negative and positive signals, said means for rectifying the signals include a diode in said first channel which passes only a positive signal and a diode in said second channel which passes only a negative signal; and, switch means connecting said channels and having a switch component adapted to pass only one or the other of said negative or positive signals to auxillary equipment.

8. The system of claim 7 wherein said first microphone means is adapted to receive sound from a predetermined source and said second microphone means is adapated to receive ambient sound.

9. The system of claim 8 wherein each of said audio channels includes means to amplify electrical signals from the microphone means.

10. The system of claim 9 wherein said switch component includes an SCR having a gate that passes only positive signals of a predetermined voltage to said auxillary equipment.

* * * * *